March 31, 1970  W. E. TOLLES ET AL  3,504,366
MEANS FOR PRODUCING RANGE AND ANGLE DECEPTION
OF AUTOMATIC TRACKING RADAR
Filed Nov. 8, 1955  3 Sheets-Sheet 1
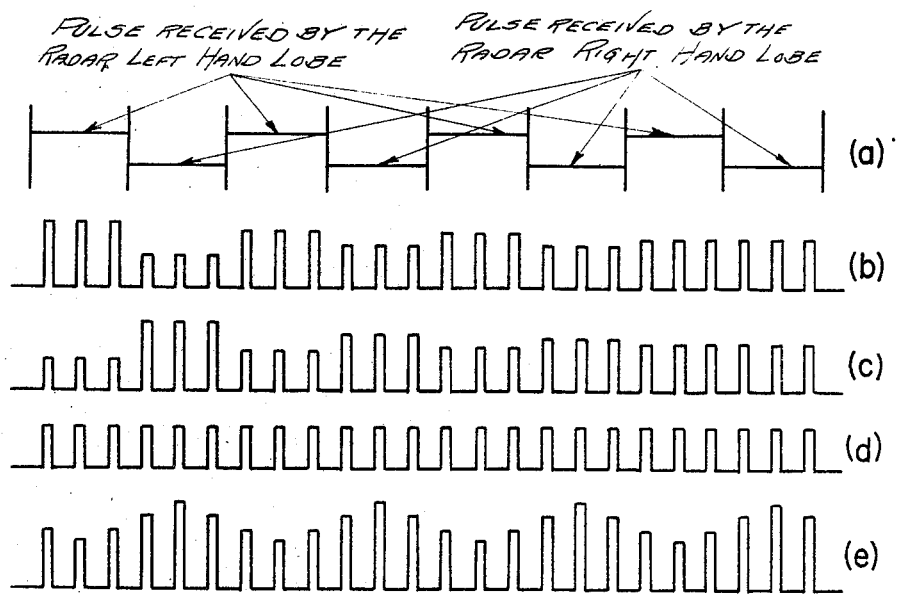
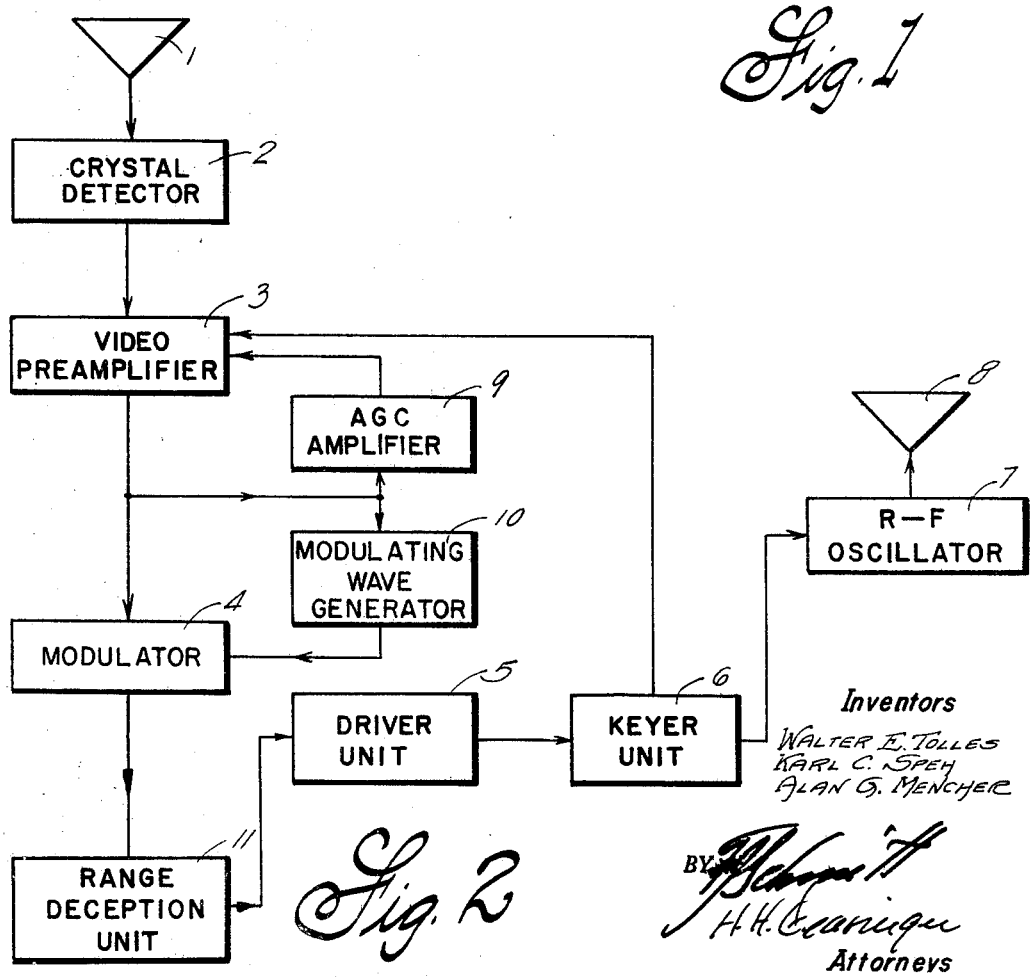
Inventors
WALTER E. TOLLES
KARL C. SPEH
ALAN G. MENCHER
Attorneys

INVENTOR.
WALTER E. TOLLES
KARL C. SPEH
BY ALAN G. MENCHER

ATTORNEYS

United States Patent Office 3,504,366
Patented Mar. 31, 1970

3,504,366
MEANS FOR PRODUCING RANGE AND ANGLE DECEPTION OF AUTOMATIC TRACKING RADAR
Walter E. Tolles, Hicksville, and Karl C. Speh, Hempstead, N.Y., and Alan G. Mencher, Zurich, Switzerland, assignors, by mesne assignments, to the United States of America as represented by the Secretary of the Navy
Filed Nov. 8, 1955, Ser. No. 545,807
Int. Cl. G01s 9/56, 7/42
U.S. Cl. 343—6.8      4 Claims

ABSTRACT OF THE DISCLOSURE

Apparatus for deceiving a sequentially lobing automatic tracking radar includes a receiver and detector which determines the amplitude differences in pulses transmitted by the tracking radar. Amplitude modulated pulses out of phase with those received are developed and transmitted, causing the tracking radar to assume a position not in the direction of the true target.

---

This invention relates to the art of deceiving automatic tracking radar as to the range and angle of a target detected thereby. More specifically, it is concerned with a means of developing signals to be radiated to such a radar, which signals are timed or shaped and amplitude modulated to deceive a sequentially lobing automatic tracking pulsed radar as to the range and angle of the target.

Sequentially lobing radar determines the angular coordinates of a target by scanning the radar antenna beam about an axis pointed approximately at the target. If the axis points exactly at the target, the axial symmetry of the moving beam results in an unmodulated target return signal. If the axis points off the target, however, the beam motion imposes an amplitude modulation on the target return signal at the lobing rate. The phase of this modulation with respect to the beam motion depends on the angular coordinates of the target. The phase is used to control a suitable servo directing the axis of scan more nearly toward the target.

If, in addition to the target return, another amplitude-modulated signal of greater magnitude and different phase is inserted into the antenna control circuits, the pointing of the scan axis depends also on the second signal. If the second signal is large enough, it controls the direction of the scan axis and draws it off the target. If, finally, the target return is completely eliminated from the antenna control circuits, the direction of the scan axis has no relation to the actual target position, and the radar is no longer tracking the target.

This last effect can be accomplised by a combination of range and angle deception. A suitable means of range deception is disclosed in the copending application of Eugene B. Novikoff for "Means for Range Deception of Pulse Type Tracking Radar," filed Apr. 18, 1955, Ser. No. 502,252. This application discloses principally a suitable means of angle deception.

It is therefore an object of this invention to provide a novel combination for deceiving automatic tracking radar as to the range and angle of a target.

It is another object of this invention to provide a system for transmitting signals out of phase to a true target return on an automatic tracking radar to cause the antenna thereof to be misdirected and lose the target.

It is a further object of this invention to provide a system for shifting the tracking gate of an automatic tracking radar away from the true target return so that signals out of phase with such return will not have to compete with them in order to deceive the radar.

Other objects and many of the attendant advantages of this invention will be readily appreciated as the same becomes better understood by reference to the following detailed description when considered in connection with the accompanying drawing wherein:

FIGURE 1 is a series of plots of voltage against time illustrating the operation of a sequentially lobing automatic radar and the operation of the novel apparatus.

FIGURE 2 is a block diagram of the elements constituting an embodiment of the invention.

Figure 3A:
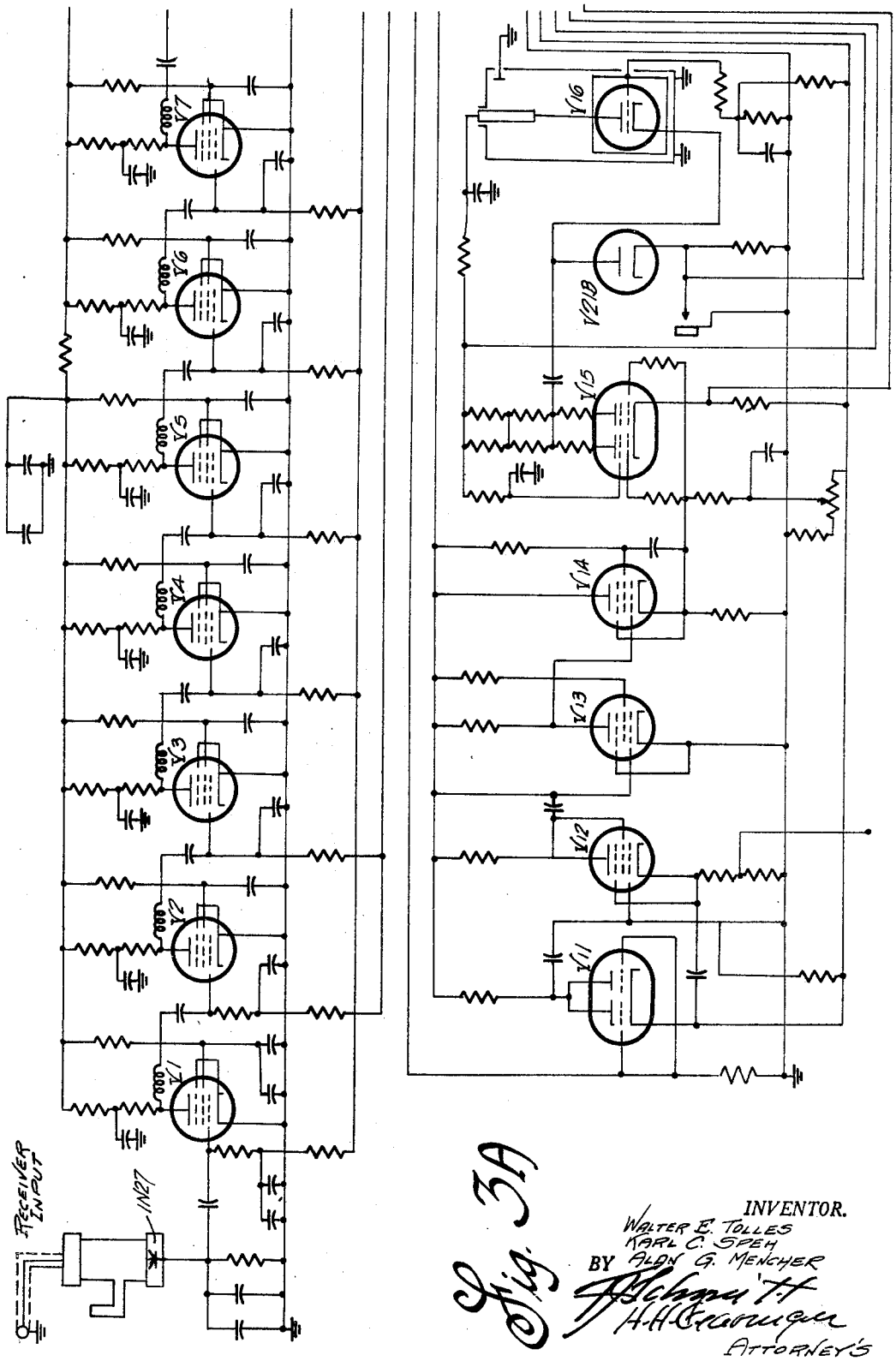
FIGURES 3a and 3b are schematic diagrams of a practical embodiment of a square wave modulating circuit for the transponding circuit of the invention.

Directing attention to FIGURE 1, there may be seen a series of plots of voltage values against time. The first of these (a) illustrates the target returns received by the automatic tracking radar when its antenna is directed toward, but not exactly at a target. If as a simple example the radar uses an antenna with two lobes, and switches from one lobe to the other, the pulses will be as shown in (a) and (b) when the target is to the left hand side of the axis of the antenna; on the other hand, when the target is to the right hand side of the axis of the antenna, the received pulses will be as shown in plot (c). Both plots (b) and (c) in FIGURE 1 also show the pulses radiated from the antenna as received at the target; the degree of modulation at the target is half that of the return at the radar receiver. Initially, (as indicated in the left hand portion of plots (b) and (c)), the pulse received by the left hand lobe and by the right hand lobe show considerable difference in amplitudes. As the axis of the antenna is directed more accurately toward the target, the pulses received by each lobe become more nearly equal, (as indicated in the right hand portions of plots (b) and (c)). When the axis of the antenna is directed exactly at the target, the pulse received by each lobe are equal as depicted in plot (d) of FIGURE 1. However, tracking can never be perfect, and there will always be some amplitude modulation, detectable in principle at the target. The modulation may be detected by a transponder described hereinafter, inverted in phase, and applied to pulses transmitted by the target which will be in contradiction to the amplitude modulation that the radar should be receiving from the target. The plot (e) shows that these transponder pulses, as received by the radar, will be indicative of a target to the right hand side of the main axis of the antenna, (compare plots (e) and (c) of FIGURE 1 and will direct the antenna accordingly. Thus, the radar will have been deceived as to the angular position of the target.

This deception as described, at least in some cases, cannot be sufficiently complete to cause the radar to lose the target, but will give only a relatively small error in tracking because the transponder return must compete with the true target return. If, however, this angle deception is applied after the tracking gate has been displaced from the true target return, using a range deception technique and device, as disclosed in the copending application of Eugene B. Novikoff referred to above, then there is no competition with the target return and the angular errors introduced will be greatly increased.

In FIGURE 2, there is disclosed a transponder for carrying out the objectives of the invention. Reference numeral 1 designates a receiving antenna. The antenna 1 is positioned in a suitable location on an aircraft or ship carrying out a mission on which it is desired to prevent continuous tracking by a radar or a guided missile. A detector 2 which may be constituted by a crystal or any other suitable type receives the output of the antenna 1. Coupled to the output of the detector 2 is a video preamplifier 3. The output of the preamplifier 3 is divided between a modulator 4, an automatic gain control circuit 9 and the modulating wave generator 10. The automatic gain control amplifier 9 has its output coupled to the preamplifier 3 to complete a gain control feedback loop while the modulating wave generator angle deception modulator 10 has its output coupled to the modulator 4 whereby its output may modulate the gain of the modulator 4 in a manner and for a purpose to be described hereinafter.

A range deception unit 11 receives the output of the modulator 4. This range deception unit may be constructed in accordance with the disclosure in the copending application of Eugene B. Novikoff, referred to above.

A driver unit 5 is triggered by the output of the range deception unit 11. A keyer unit 6 is coupled to the driver 5 and modulates the R-F oscillator 7. A feedback loop couples the keyer 6 to the preamplifier 3 to blank the preamplifier and prevent regeneration of the transmitted pulse. The output of the R-F oscillator is then radiated from the transmitting antenna 8 that is related to the pulse intercepted by the receiving antenna 1 in a manner to be described in greater detail hereinafter.

The operation of the transponder is as follows: A pulse from a radar is intercepted by receiving antenna 1, and converted to video frequency in crystal detector 2. The signal is then amplified by video preamplifier 3, a portion of whose output is fed back through the automatic gain control loop 9. The AGC amplifier in this loop has a long time constant compared with a period of the sequential lobing of the tracking radar and operates on the preamplifier 3 in such a manner as to maintain the long time average signal fed from preamplifier 3 to the modulator 4 at a substantially constant value. The modulating wave generator 10 which is receiving the substantially constant output of the preamplifier 3 is constructed in such a manner that upon the receipt of pulses from the preamplifier that are greater in amplitude than a value determined by the setting of the automatic gain control amplifier 9, it will modulate the gain of modulator 4 to produce output pulses of least amplitude. Upon receipt of pulses of smaller amplitude from said preamplifier 3, the modulating wave generator 10 will operate to develop pulses of greater amplitude in the modulator 4. The amplitude modulation in this case will be automatically controlled to be at the frequency of, but out of phase with, the modulation required by the tracking radar for its determination of the position of the target.

After modulation by modulating wave generator 10, the signals from modulator 4 are fed to range deception unit 11 and then to driver unit 5. Driver unit 5 operates keyer unit 6 so as to modulate R-F oscillator 7. Thus, the pulses radiated by the transmitting antenna 8 are modulated in amplitude in a manner similar to that which would otherwise have been produced by the lobing operation of the tracking radar antenna were the target on the side of the axis opposite from that side on which it is in fact.

Figure 3B:
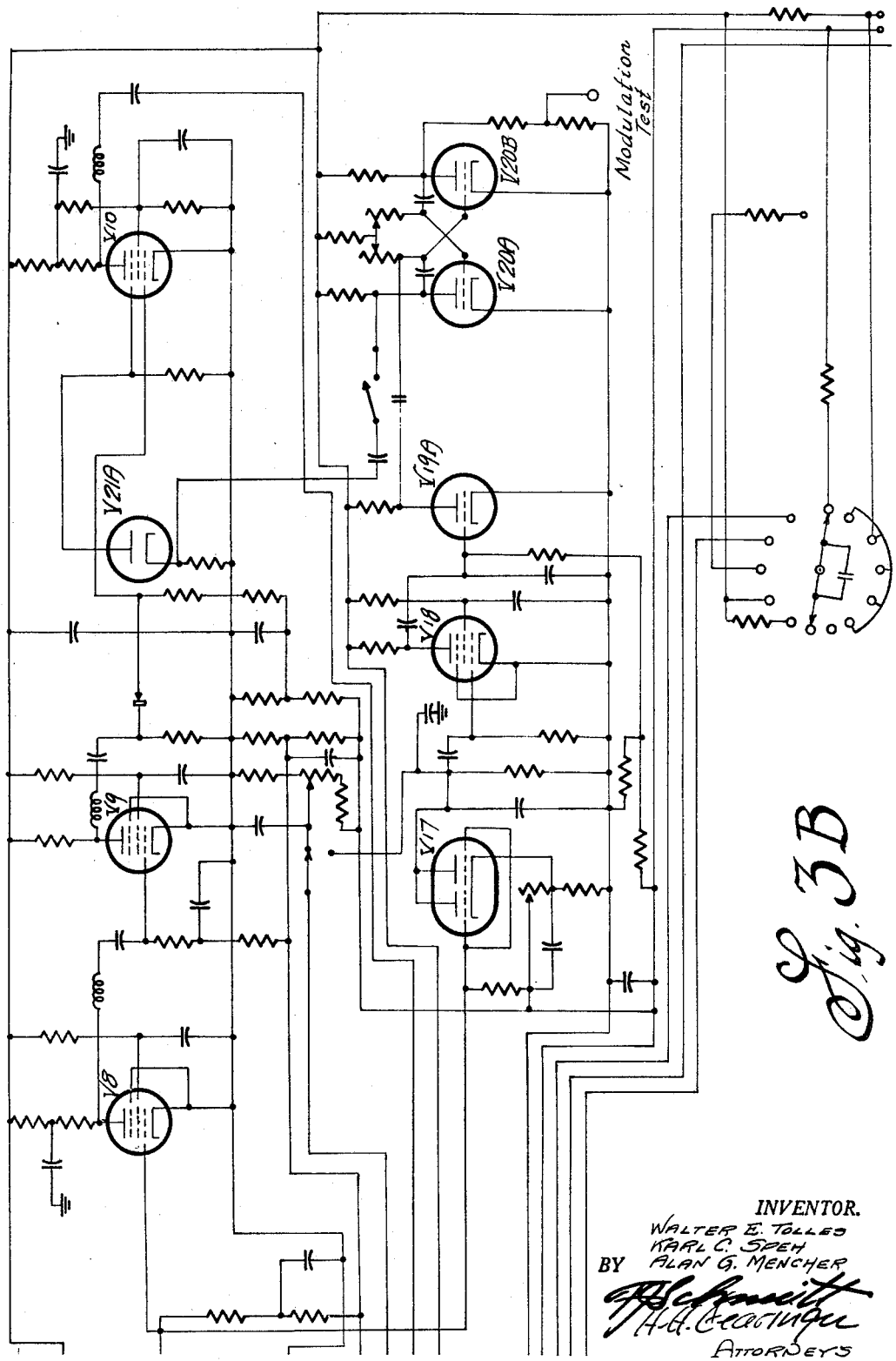

In a practical embodiment of the techniques described it is most convenient to impose "on-off" or square-wave modulation on the transponder returns. Then no signal at all is radiated by the transponder during positive half-cycles of the incoming carrier signal, and full power is radiated during negative half-cycles. FIGURES 3a, 3b, are a schematic diagram of one such practical embodiment.

The R-F input circuit to the crystal video receiver consists of a tunable concentric line section. This line serves to match the antenna circuits to the 1N27 crystal rectifier mounted at one end of the tunable line. The best position for the tuning stub is a function both of the frequency to be received and of the particular 1N27 crystal used. The band of this input circuit is very wide: 400 mc. between the half-power points.

To preserve the rise time of the received signals with a high degree of fidelity, the crystal-video receiver of the transponder was designed to have a 10-mc. bandwidth.

Stages V-1 through V-9 (FIGURES 3a, 3b) are the nine video amplifier stages of the receiver.

The output of the video amplifier is fed to a 6AS6 switch tube (V-10). Whenever it is desired to modulate the transponder output at the lobing rate of the attacking radar, a signal at this frequency can be inserted on the suppressor of the switch tube, cutting off the tube at the lobing rate and thereby denying trigger pulses to the modulator circuits of the transponder. A diode (V21A) permits only the negative pulses of the multivibrator output to be applied to the switching-tube suppressor.

The modulation multivibrator (V20A, V20B) is an astable multivibrator. It can be tuned to the expected lobing frequency of the attacking radar by a front-panel tuning control. As soon as the incoming pulse signals have a detectable modulation envelope, the multivibrator will be synchronized with this envelope in such a manner that the switch tube will be cut off whenever the incoming pulse envelope is passing through a positive half cycle.

The synchronization for the multivibrator is provided by detecting the pulse envelope of the attacking radar signal in a 6J6 peak detector (V17) and passing the detected envelope through a voltage amplifier (V18) and a buffer amplifier (V19A).

If the detector were to saturate on signals from the radar as the range decreased, the modulation envelope would be lost. To prevent this, the peak detector (V17) that supplies synchronizing voltage to the modulation multivibrator also supplies an AGC filter circuit. The output of this filter controls receiver gain by varying the bias of the second and third video amplifiers. All other video stages have a fixed control-grid D-C bias. An internal "AGC level" control can be used to adjust the gain of the AGC circuits and to set the level of D-C bias on the second and third video amplifiers in the absence of pulse input to the receiver. The AGC action begins as soon as any pulses are received. The AGC system has a dynamic range of at least 20 db. Front-panel controls make it possible to control the receiver gain manually if desired.

The video signals from the switch are coupled to the range deception unit 11, which comprises in FIGURE 3 tubes V11, V12 and V13 and their associated circuits. More specifically the video signals from the switch are used to trigger a monostable multivibrator (V11, V12). Cathode-coupled, this multivibrator was designed to give a positive pulse with an extremely short rise time—and with a minimum of delay. The wide (7-μsec.) multivibrator pulse is electron-coupled through the 6AK6 pentode (V12) to the 6AK6 shaping amplifier (V13), which gives a sloping top to the pulse. This positive pulse is then applied through a 6AK6 cathode follower (V14) to the control grid of 3E29 keyer tube (V15).

The two halves of the keyer tube are connected in parallel. The positive pulses at the control grid will produce negative pulses of several hundred volts at the plates of the 3E29. These pulses are coupled to the cathode of the 2C40 R-F oscillator (V16). The keyer pulse has the effect of bringing the 2C40 out of cutoff and into oscillation for the duration of the keyer pulse. The envelope of the output oscillations will be of essentially the same shape as the 3E29 plate pulse.

A 6AL5 diode (V21B) serves to recharge the coupling capacitor between the 3E29 plates and the 2C40 cathode during the intervals between pulses.

A front-panel meter with a seven-position selector can be used to monitor the equipment.

The presence of this amplitude modulation on the signal pulses returned to the tracking radar prevents the radar from determining the exact angular position of the target. In addition, the range deception unit 11, by removing the true target return from competition, prevents automatic tracking of the radar.

Obviously many modifications and variations of the present invention are possible in the light of the above teachings. It is therefore to be understood that within the scope of the appended claims the invention may be practiced otherwise than as specifically described.

What is claimed is:

1. A transponder comprising: amplitude-modulated signal receiving and detecting means, means for amplifying the output of said receiving and detecting means, means for amplitude-modulating the output of the amplifying means out of phase with the signals originally received and means for transmitting the output of last mentioned means.

2. A transponder comprising: means for receiving amplitude-modulated signals, detecting means coupled to the output of said receiving means, amplifying means for the output of said detecting means, said amplifying means including an automatic gain control loop whereby a substantially constant average output is maintained, a modulating wave generator means receiving the output of said amplifying means, modulation means coupled to said amplifying means and said modulating wave generator to modulate the amplitude of the signals in phases different from that in which they are received, and transmitting means coupled to output of said second amplifying means.

3. A device for deceiving sequentially lobing automatic tracking radar comprising: means for receiving pulses transmitted by said radar, means for detecting amplitude differences in said pulses, means for developing pulses differing in amplitude in phases and amounts other than those in which said radar pulses differ, and means for transmitting said developed pulses whereby said developed pulses when received by said radar will cause it to develop incorrect information as to the angle of a target carrying the deceiving device.

4. A device to be borne by a prospective target of a multilobing automatic tracking pulse radar comprising means for receiving pulses transmitted by said radar, means for detecting existing amplitude differences in said pulses, amplifying means coupled to the output of said detecting means, an automatic gain loop in said amplifying means whereby a substantially constant output is obtained, means modulating the output of said amplifying means to cause said amplifying means to develop pulses having amplitudes differing in phase and amount from the radar transmitted pulses and means for transmitting said developed pulses back to said radar.

References Cited

UNITED STATES PATENTS 2,443,643   6/1948   Schelleng _____ 343—18

RICHARD A. FARLEY, Primary Examiner

B. L. RIBANDO, Assistant Examiner

U.S. Cl. X.R.

343—18